(12) United States Patent
Han et al.

(10) Patent No.: US 6,269,385 B1
(45) Date of Patent: Jul. 31, 2001

(54) APPARATUS AND METHOD FOR PERFORMING ROUNDING AND ADDITION IN PARALLEL IN FLOATING POINT MULTIPLIER

(75) Inventors: Tack Don Han; Woo Chan Park, both of Seoul (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/126,441

(22) Filed: Jul. 30, 1998

(30) Foreign Application Priority Data

Mar. 10, 1998 (KR) .................................................... 98-7932

(51) Int. Cl.[7] ........................................................ G06F 7/38
(52) U.S. Cl. ............................ 708/596; 708/503; 708/597
(58) Field of Search ............................ 708/495–499, 708/503, 505, 550–553, 620, 625, 628, 629, 630, 631

(56) References Cited

U.S. PATENT DOCUMENTS

| | | | |
|---|---|---|---|
| 5,150,319 | * 9/1992 | Zyner | 708/497 |
| 5,568,412 | 10/1996 | Han et al. | 364/748 |
| 5,742,537 | * 4/1998 | Wolrich et al. | 708/499 |
| 5,790,446 | * 8/1998 | Yu et al. | 708/625 |
| 5,909,385 | * 6/1999 | Nishiyama et al. | 708/497 |

* cited by examiner

*Primary Examiner*—Chuong Dinh Ngo
(74) *Attorney, Agent, or Firm*—Fleshner & Kim, LLP

(57) ABSTRACT

An apparatus and a method for performing rounding and addition in parallel in a floating point multiplier are disclosed, in which operation time and the size of a chip can be reduced. The apparatus includes an adder having an n bit half adder and an 1 bit full adder to add high n+1 bit from carry C and sum S of 2n bit and 1 bit of predictor, a $C^{in}_{n-2}$ generator for generating carry $C^{in}_{n-2}$ for addition of low n−2 bit to carry C and sum S of 2n bit, a predictor for providing 0 or 1 to the full adder when generating the added carry C of n bit and sum S of n+1 bit, a carry select adder for adding 0 or 1 to high n bit value of carry and sum added through the adder to output its result values i0 and i1, a selector for outputting a control signal of 0 or 1 to select a value obtained by addition and rounding from two output values of the carry select adder, a multiplexer for multiplexing the results of i0 and i1 from one of a round-to-nearest mode, a round-to-zero mode, and a round-to-infinity mode in response to the control signal of the selector, and a $q^{NS}_0$ logic circuit for generating the least significant bit LSB for a round value during no shift (NS). The floating point multiplier supports four rounding modes according to IEEE's standard.

12 Claims, 5 Drawing Sheets

APPARATUS AND METHOD FOR PERFORMING ROUNDING AND ADDITION IN PARALLEL IN FLOATING POINT MULTIPLIER

BACKGROUND OF THE INVENTION

1. Field of the Invention

The present invention relates to a floating point multiplier, and more particularly, to an apparatus and a method for performing rounding and addition in parallel corresponding to four modes of IEEE's standard in a floating point multiplier.

2. Discussion of the Related Art

Generally, a floating point arithmetic unit is necessarily used in graphic accelerators, digital signal processor, and computer systems with high performance. As chip integration capability increases due to advances in semiconductor technology, it has become possible for the floating point arithmetic unit to be put on a single chip together with a central processing unit (CPU), allowing the floating point arithmetic unit to exceed its original supplementary function and is now the principal element of the main arithmetic unit. In case that the floating point arithmetic unit is built on a single chip, only some primary arithmetic units such as an adder, a subtractor and a multiplier are built on the chip due to the limited space of the CPU, and additional software is used for further operation. Therefore, the conventional floating point multiplication operation greatly influences the entire operation of the floating point.

Meanwhile, a fraction portion in the floating point multiplication operation includes four steps of multiplication, addition of carry and sum produced by multiplication, normalization, and rounding. Alternatively, the fraction portion includes four steps of multiplication, addition, rounding, and normalization.

There are two types of 32 bits single precision and 64 bits double precision in IEEE's standard relating to an expression of the floating point number for performing the above steps. The single precision type consists of a sign bit of 1 bit, an exponent of 8 bits and a fraction of 23 bits. The double precision type consists of a sign bit of 1 bit, an exponent of 11 bits and a fraction of 52 bits.

An arithmetic unit according to the IEEE's standard is as follows.

<Equation 1>

$$A=(-1)^s \times 1.f \times 2^{e-bias}$$

Where s denotes a sign bit for a fraction f, f denotes a fraction expressed in an absolute value, and e denotes an exponent expressed in a bias. The normalized fraction means that the most significant bit (MSB) is 1 bit and in an expression of the floating number point the MSB is hidden bit because the MSB can be omitted.

For the sake of rounding according to IEEE's standard, there are generated round bit and sticky bit as follows.

If the fractions A and B are multiplied together in two floating point numbers, the sum of 2n bit, $S=s_{2n-1}s_{2n-2} \ldots s_0$ and carry, $C=c_{2n-1}c_{2n-2} \ldots c_0$ are generated. After the S and C are respectively generated, a result F of 2n bit is generated as a result of addition of S anc C. The result F includes high n+1 bit of the fraction in the floating point and low n−1 bit of omitted portion. The rounding is based on low n−1 bit of the result F.

This information can be expressed by round bit and sticky bit. The rounding mode designated by IEEE's standard can be performed by these bits. The round bit R is the MSB of low n−1 bit from the result F and the sticky bit Sy is an ORed operation value for low n−2. Therefore, the result F can be expressed as follows.

<Equation 2>

$$F=C+S$$
$$=(c_{2n-1}c_{2n-2} \ldots c_{2n-1}c_{2n-2} \ldots)+(s_{2n-1}s_{2n-2} \ldots s_{n-1}s_{n-2} \ldots)$$
$$=f_{2n-1}f_{2n-2} \ldots f_{n-1}f_{n-2} \ldots f_0$$
$$=f_{2n-1}f_{2n-2} \ldots f_{n-1}RSy$$

In IEEE's standard, there are four rounding methods, i.e., round-to-nearest, round-to-zero, round-to-positive-infinity, and round-to-negative-infinity.

The four rounding methods are shown in the following tables 1, 2, 3 and 4.

IEEE's rounding mode according to signs is shown in the table 1.

TABLE 1

| IEEE rounding modes | positive number | negative number |
| --- | --- | --- |
| round-to-nearest | round-to-nearest | |
| round-to-zero | round-to-zero | |
| round-to-positive-infinity | round-to-infinity | round-to-zero |
| round-to-negative-infinity | round-to-zero | round-to-infinity |

The rounding results of the round-to-nearest for the LSB, R, and Sy are shown in the table 2.

TABLE 2

| LSB | Round bit | Sticky bit | Round-off result |
| --- | --- | --- | --- |
| 0 | 0 | 0 | truncation |
| 0 | 0 | 1 | truncation |
| 0 | 1 | 0 | truncation |
| 0 | 1 | 1 | increment |
| 1 | 0 | 0 | truncation |
| 1 | 0 | 1 | truncation |
| 1 | 1 | 0 | increment |
| 1 | 1 | 1 | increment |

The rounding results of the round-to-zero for R and Sy are shown in the table 3.

TABLE 3

| Round bit | Sticky bit | Round-off result |
| --- | --- | --- |
| 0 | 0 | truncation |
| 0 | 1 | truncation |
| 1 | 0 | truncation |
| 1 | 1 | truncation |

The rounding results of the round-to-infinity for R and Sy are shown in the table 4.

TABLE 4

| Round bit | Sticky bit | Round-off result |
| --- | --- | --- |
| 0 | 0 | truncation |
| 0 | 1 | increment |

TABLE 4-continued

| Round bit | Sticky bit | Round-off result |
|---|---|---|
| 1 | 0 | increment |
| 1 | 1 | increment |

The tables 2 to 4 show the rounding results of the round-to-nearest, round-to-zero, and round-to-infinity for the LSB, R, and Sy of the fractions generated after the steps of multiplication, addition, and normalization excluding rounding in the floating point multiplication operation.

FIG. 1 is a block diagram illustrating process steps of a fraction portion in a conventional floating point multiplier. The process steps of the fraction portion includes multiplication, addition, rounding, and normalization.

The conventional floating point multiplier includes a modified booth encoder (not shown), a Wallace tree/array 10, a sticky bit generator 20, a carry select adder 30, and a $C_{in}$ generator 40. The modified booth encoder generates partial products from two n-bit binary operand. The Wallace tree/array 10 generates n+2 MSB carry/sum bit and n−2 LSB carry/sum bit from the partial products. The sticky bit generator 20 generates sticky bit Sy as compensation information for data loss of the fraction portion from the n bit binary. The carry select adder 30 adds the n+2 MSB carry/sum bit of the Wallace tree/array 10. The $C_{in}$ generator 40 generates only carry value from the n−2 LSB carry/sum bit. The results of n bit are output after the rounding step of the results of the carry select adder 30 and normalization step.

The steps of multiplication, subtraction, rounding, and normalization will be described in detail.

First, in the multiplication step, partial products generated by the modified booth encoder are calculated into sum and carry of 2n bit using the Wallace tree array 10.

Since the addition step requires the high n+2 bit, the results of the addition for the low n−2 are not required. Therefore, addition of carry and sum of high n+2 bit generated in the multiplication step is only required and carry generated by the results due to addition of carry and sum for the low n−2 bit only influences addition of the high n+2 bit.

As a result of addition of carry and sum for the low n−2 bit, if the carry is 1, 1 is added to the results of addition of carry and sum for the high n+2 bit. While, if the carry is 0, 0 is added to the results of addition of carry and sum for the high n+2 bit. The addition of carry and sum for the high n+2 bit can be realized by the carry select adder 30. The addition of carry and sum for the low n−2 can be realized by the $C_{in}$ generator 40 which serves as a logic circuit which generates only carry for the addition of low n−2 carry and sum. Therefore, 2n bit adder can be replaced with the $C_{in}$ generator 40. The results of the addition can be expressed as follows.

<Equation 3>

$$f_{2n-1} \ldots f_{n-1} = (c_{2n-1} \ldots c_{n-2}) + (s_{2n-1} \ldots s_{n-2}) + c^{in}_{n-2}$$

Where $c^{in}_{n-2}$ is the overflow value after $cn_{n-3} \ldots c_0$ plus $S_{n-3} \ldots S_0$. At this time, $c^{in}_k$ is k bit carry from high k−1st bit.

If it is defined as $D = c_{2n-1} \ldots c_{n-1} + s_{2n-1} \ldots s_{n-1}$, $f_{2n-1} \ldots f_{n-1}$ can be expressed as follows.

<Equation 4>

$$f_{2n-1} \ldots f_{n-1} = (c_{2n-1} \ldots c_{n-2}) + (s_{2n-1} \ldots s_{n-2}) + c^{in}_{n-2} = D + c^{in}_{n-1}$$

Where, carry $c^{in}_{n-1} = \text{overflow}(c_{n-2} + s_{n-2} + c^{in}_{n-2})$.

The overflow Z returns 1 if the overflow occurs as a result of operation of Z. While the overflow Z returns 0 if not so.

In the rounding step, if the MSB value after addition step is $f_{2n-1}=1$, the result of the rounding is added to $f_{2n-1} \ldots f_n$. If the MSB value after addition step is $f_{2n-1}=0$, the result of the rounding is added to $f_{2n-2} \ldots f_{n-1}$. At this time, if overflow occurs in the normalization step, shift to the right by 1 bit is required and also the exponent increment is required. If the overflow does not occur, shift is not required. In case of one, it is expressed as right shift (RS). In case of the other, it is expressed as no shift (NS).

Sticky bit Sy which determines the result of the rounding becomes 0 if the sum of trailing-zero of two fraction portions input to the floating point multiplier is greater than n−2. While the sticky bit Sy becomes 1 if the sum of trailing-zero of two fraction portions is smaller than n−2. The sticky bit Sy is obtained in parallel when carry and sum are generated by multiplying the two fraction portions. It is assumed that the result value after rounding step in case of NS is $Q^{NS}$ and the result value after rounding step in case of RS is $Q^{RS}$. In this case, the position of rounding in case of NS is $f_{n-1}$ and the position of rounding in case of RS is $f_{n-2}$. Therefore, significant position in case of RS is higher by 1 bit than that in case of NS. The result values $Q^{NS}$ and $Q^{RS}$ can be expressed as follows.

<Equation 5>

$$Q^{NS} = (f_{2n-1} \ldots f_{n-1}) + \text{rounding}_{mode}(f_{n-1}, R, Sy)$$
$$Q^{RS} = (f_{2n-1} \ldots f_{n-1}) + 2 \times \text{rounding}_{mode}(f_n, f_{n-1}, R \lor Sy)$$

Where, the $\text{rounding}_{mode}(f_{n-1}, R, Sy)$ means the result of rounding for a corresponding rounding mode. The rounding mode has 1 if the result of rounding is carry, while the rounding mode has 0 if not. The input parameters of $\text{rounding}_{mode}(f_n, f_{n-1}, R \lor Sy)$ is shifted formats of input parameters of NS case to the right by 1 bit during RS.

Finally, in the normalization step, 1 bit shift to the right is performed if the MSB of the result of the rounding is 1 while high n bit is output without shift if the MSB is 0. At this time, "∧" denotes AND operation, "∨" denotes OR operation, "⊕" denotes exclusive OR operation, and "⊗" denotes exclusive NOR operation.

In the steps of multiplication, addition of carry and sum, normalization, and rounding generated by the conventional floating point multiplication operation, or in the steps of multiplication, addition, rounding, and normalization, a separate high speed incrementer or adder is used for process of rounding. In addition, for the steps of multiplication, addition, normalization, and rounding, a separate hardware is required for renormalization due to overflow during rounding. For the steps of multiplication, addition, rounding, and normalization, a separate hardware is required for performing rounding prior to normalization. For this reason, an area of the arithmetic unit becomes large and operation process time becomes longer.

SUMMARY OF THE INVENTION

Accordingly, the present invention is directed to an apparatus and a method for performing rounding and addition in parallel in a floating point multiplier that substantially obviate one or more of the problems due to limitations and disadvantages of the related art.

An object of the present invention is to provide an apparatus and a method for performing rounding and addition in parallel in a floating point multiplier in which operation time and the size of a chip can be reduced.

Another object of the present invention is to provide an apparatus and a method for performing rounding and addition in parallel in a floating point multiplier in which a separate hardware for an adder required for rounding is not required because rounding and addition are performed in parallel in a single pipeline.

Other object of the present invention is to provide an apparatus and a method for performing rounding and addition in parallel in a floating point multiplier in which four rounding modes of round-to-nearest, round-to-zero, round-to-positive-infinity, and round-to-negative-infinity according to IEEE's standard are applicable and floating point multiplication can be performed by three steps for fast speed operation process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for performing rounding and addition in parallel in a floating point multiplier according to the present invention includes an adder having an n bit half adder and an 1 bit full adder to add high n+1 bit from carry C and sum S of 2n bit and 1 bit from predictor, a $C^{in}_{n-2}$ generator for generating $c^{in}_{n-2}$ from the overflow signal of addition of low n-2 to carry C and sum S of 2n bit, a predictor for providing 0 or 1 to the full adder, a carry select adder for adding 0 or 1 to high n bit value of carry and sum added through the adder to output its result values i0 and i1, a selector for outputting a control signal of 0 or 1 to select a value obtained by addition and rounding from two input values of the carry select adder, a multiplexer for multiplexing the results of i0 and i1 from one of a round-to-nearest mode, a round-to-zero mode, and a round-to-infinity mode in response to the control signal of the selector, and a $q^{NS}_0$ logic circuit for generating the least significant bit LSB for a round value during no shift (NS).

In another aspect, a method for performing rounding and addition in parallel in a floating point multiplier according to the present invention includes a multiplication step of multiplying fraction portions of two n bit floating point numbers to generate sum S and carry C of 2n bit, a first addition operation step of performing addition operation of the fraction portion for carry and sum obtained by the multiplication step in response to variable value of a predictor, a second addition operation step of adding 0 or 1 to the result value of the fraction portion generated by the first addition operation step, a multiplexing step of the fraction portion of selectively outputting the result after rounding and addition supporting all IEEE standard rounding modes in response to operation result of the second operation step, and a normalization step of normalizing a result value obtained by the addition operation to output a final operation value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
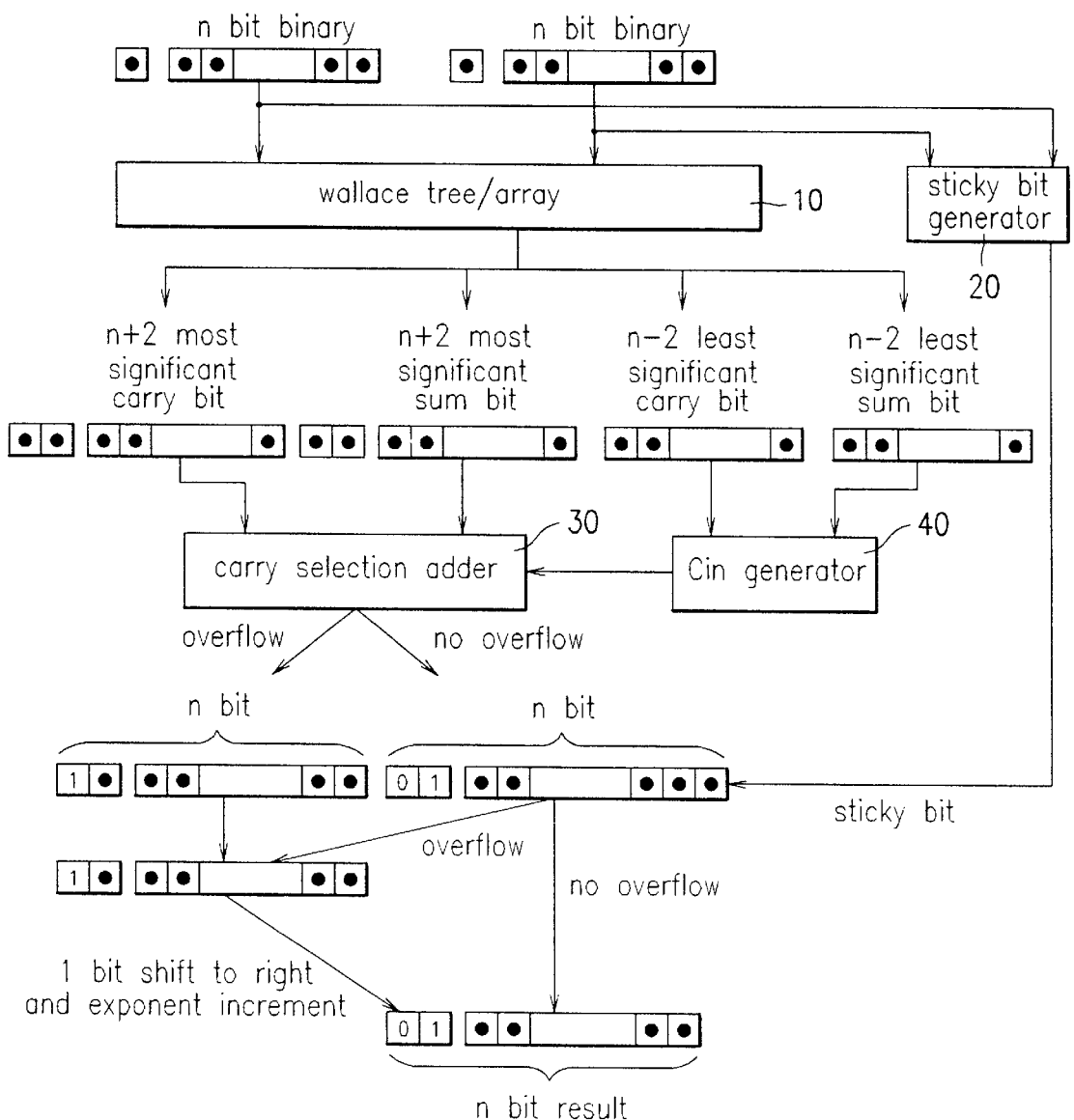
FIG. 1 is a block diagram illustrating process steps of a fraction portion in a conventional floating point multiplier.
Figure 2:
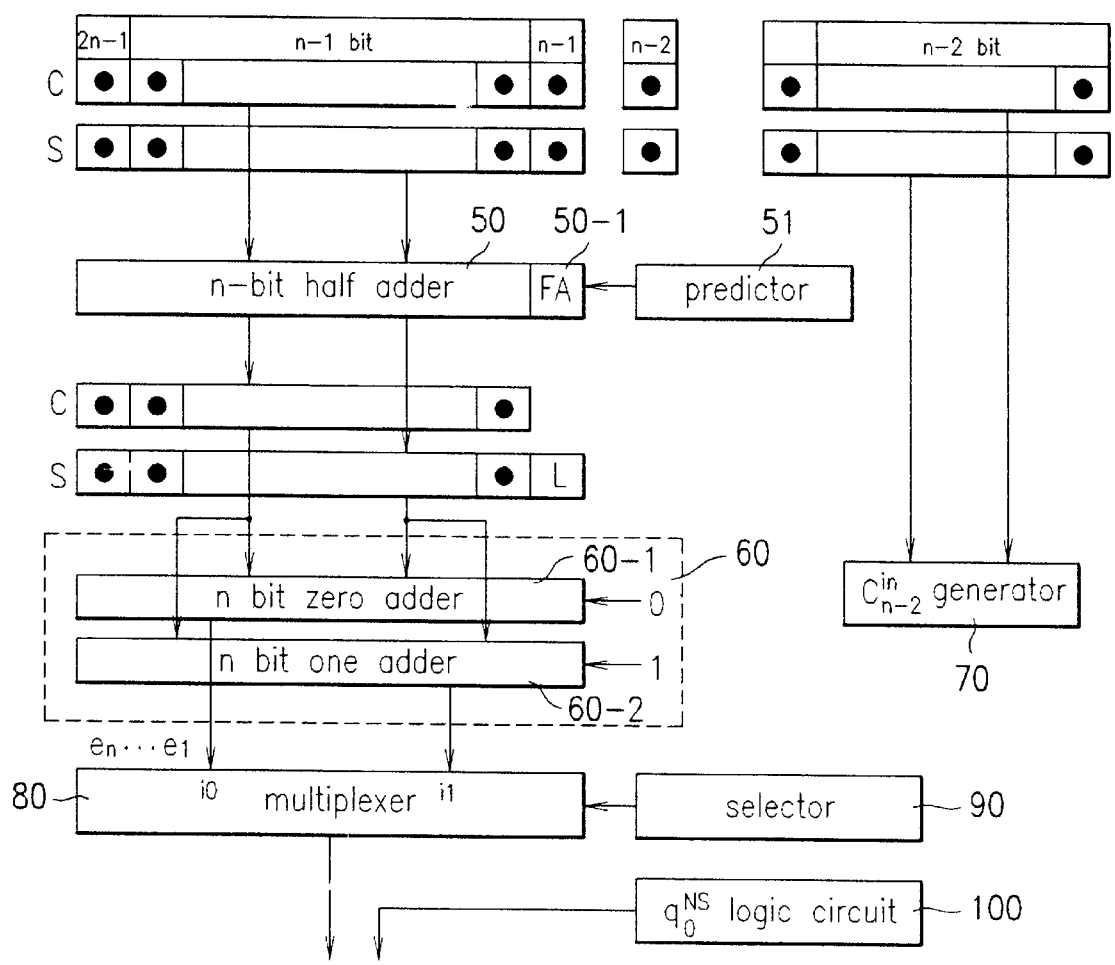
FIG. 2 is a block diagram illustrating configuration for performing rounding and addition in parallel in a floating point multiplier according to the present invention.

As shown in FIG. 2, a floating point multiplier of the present invention includes an n bit half adder 50, an 1 bit full adder 50-1, a predictor 51, a carry select adder 60, a $c^{in}_{n-2}$ generator 70 for generating carry $C^{in}_{n-2}$, a multiplexer 80 for multiplexing a result value of the carry select adder 60, a selector 90 for outputting a control signal to the multiplexer 80 in response to a round mode, and a $q^{NS}_0$ logic circuit 100 for generating 0th bit value in case of no shift (NS).

First, high n+1 bit is added to carry C and sum S of 2n bit using the n bit half adder 50 and the 1 bit full adder 50-1. At this time, an output value of the predictor 51 is input to the full adder 50-1.

Then, carry C of n bit and S of n+1 bit added through the n bit half adder 50 and the 1 bit full adder 50-1 are generated. At this time, the least significant bit of sum of n+1 bit is defined as L.

The high n bit value of carry and sum generated through the half adder 50 and the full adder 50-1 is added through the carry select adder 60 consisting of an n bit 0 adder 60-1 and an n bit 1 adder 60-2. The added value is input to the multiplexer 80.

The selector 90 serves as a control signal of the multiplexer 80. If the selector is equal to 0, the selector 90 selects i0. If the selector is equal to 1, the selector 90 selects i1. The selector 90 provides a selection signal to the multiplexer 80 in response to a sign of operation result and a round mode. As shown in the table 1, the multiplexer 80 selects one of round-nearest mode, round-to-zero mode, and round-to-infinity and multiplexes the results of i0 and i1.

The output value of the multiplexer 80 becomes D+predictor or D+predictor+2 depending on a selection value of the selector 90. The reason why the output value of the multiplexer 80 becomes D+predictor+2 is that the high bit is higher significant by 1 bit than a reference bit, n-1st bit, as 1 is added to nth bit by the carry select adder 60. Therefore, to perform rounding and addition in parallel according to the equations 4 and 5, it is necessary to adequately generate the result values of D, D+1, D+2, and D+3.

In FIG. 2, if the predictor 51 and the selector 90 are adequately selected, it is possible to generate a value Q obtained by performing addition and rounding in parallel. In designing a logic circuit of the predictor 51, signals input to the predictor 51 should be determined before the carry select adder 60 performs addition. In addition, the logic circuit of the predictor 51 should be selected carefully to realize an optimal selector.

Figure 3:
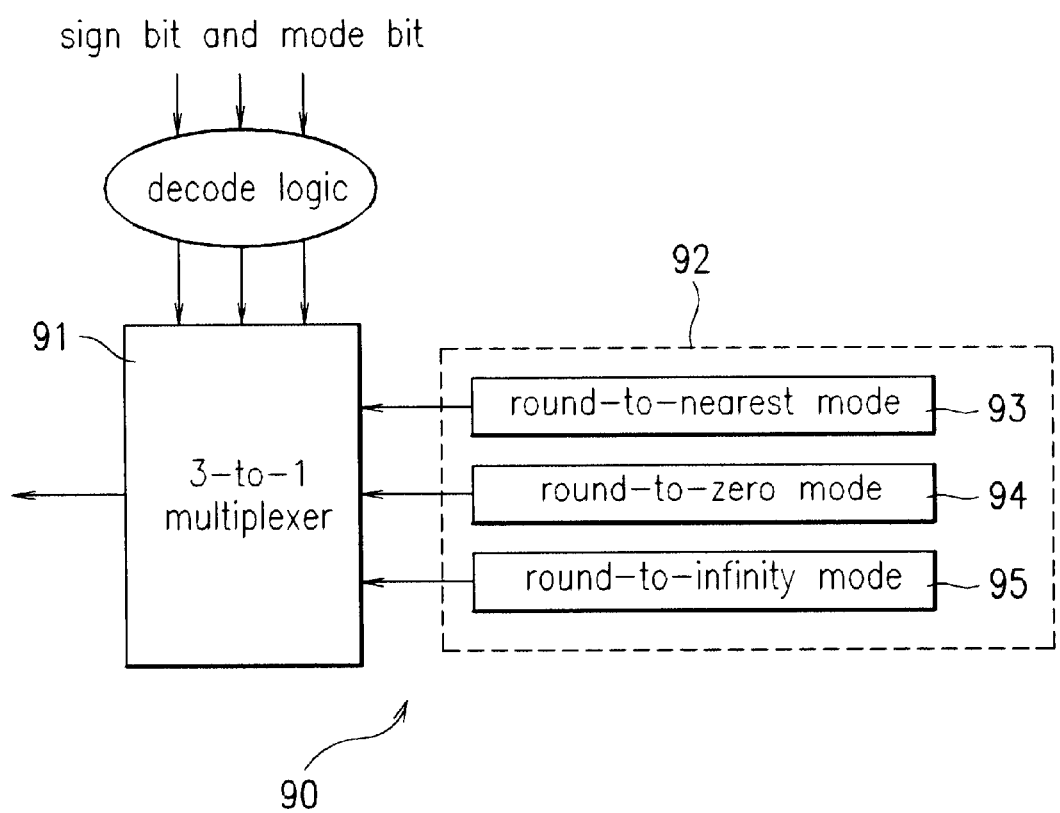
FIG. 3 is a schematic view illustrating connection between multiplexer and a selector of FIG. 2.

FIG. 3 is a schematic view illustrating the selector 90 according to a sign and a round mode. As shown in FIG. 3, the selector 90 includes a decoder logic for decoding a sign bit and a mode bit, and a 3-to-1 multiplexer 91 for multiplexing the result value of one of three modes in a round mode 92 in response to decoding bits of the decoder logic.

It is assumed that the input value of i0 input to the multiplexer 80 is $E = e_n e_{n-1} e_{n-2} \ldots e_1$. In this case, the added value of the input value of i0 and L(the least significant bit) is equal to the added value of high n+1 bit of carry C and sum S and the value of the predictor 51. Therefore, the following equation is obtained.

<Equation 6>

$$(c_{2n-1} \ldots c_{n-1}) + (s_{2n-1} \ldots s_{n-1}) + \text{value of the predictor} = E = e_n e_{n-1} e_{n-2} \ldots e_1 L$$

1) Round-to-nearest mode, 2) round-to-zero mode, and 3) round-to-infinity mode depending on the two mode bits and result sign bit and the selector 90 will be described below.

1) Round-to-nearest Mode

To make increment as the result of rounding in case of RS, the position of fn−1 bit corresponds to R bit and thus $f_{n-1} = 1$ is achieved by the table 2.

To perform rounding and addition in parallel according to the equation 5, it is necessary to generate D, D+1, and D+2. If the value of the predictor is 0, the input value to the multiplexer 80 becomes D and D+2. At this time, since high n bit of D or D+2 is equal to high n bit of D+1, it is possible to generate D, D+1, and D+2 when the value of the predictor is 0.

Referring to the equation 5, if the value of the predictor is 0, to make the value 1 of the selector 90 in case of NS, the value of $C^{in}_n$ generated by $c^{in}_{n-2}, c_{n-2}, S_{n-2}, c_{n-1}, S_{n-1}$ should be 1 or rounding$_{mode}(f_{n-1}, R, Sy)$ should be 1. To make the value 1 of the selector 90 in case of RS, $c^{in}$ should be 1 or $f_{n-1} = 1$, and rounding$_{mode}(f_n, f_{n-1}, R \lor Sy)$ should be 1. Therefore, the selector 90 in case of NS or RS can be expressed as follows.

<Equation 7>

$$\text{Selector}^{NS} = c^{in}_n \lor (f_{n-1} \land \text{rounding}_{mode}(f_{n-1}, R, Sy))$$
$$\text{Selector}^{RS} = c^{in}_n \lor \text{rounding}_{mode}(f_n, f_{n-1}, R \lor Sy)$$

The least significant bit (LSB) value of the $q^{NS}_0$ logic circuit 100 in case of NS is output according to the following equation 8.

<Equation 8>

$$q^{NS}_0 = f_{n-1} \oplus \text{rounding}_{mode}(f_{n-1}, R, Sy)$$

At this time, the selector 90 and the $q^{NS}_0$ logic circuit 100 have variables required for operation by the following equation.

<Equation 9>

$$R = c_{n-2} \oplus s_{n-2} \oplus c^{in}_{n-2}$$
$$c^{in}_{n-1} = \text{overflow}(c_{n-2} + s_{n-2} + c^{in}_{n-2})$$
$$= (c_{n-2} \land s_{n-2}) \lor (c_{n-2} \land c^{in}_{n-2}) \lor (s_{n-2} \land c^{in}_{n-2})$$
$$c^{in}_n = \text{overflow}(L + c^{in}_{n-1}) = L \land c^{in}_{n-1}$$
$$f_{n-1} = c_{n-1} \oplus s_{n-1} \oplus c^{in}_{n-1} = L \oplus c^{in}_{n-1}$$
$$f_n = c_n \oplus s_n \oplus c^{in}_n = e_1 \oplus c^{in}_{nn}$$

To select more efficient variable, the selector 90 can select $c_{n-2}$ of $s_{n-2}$ from the predictor 51 as a carry signal. This is equal to the overflow$(c_{n-2}+s_{n-2})$, and the result of the predictor 51 can be expressed as follow.

<Equation 10>

$$\text{Predictor} = c_{n-2} \land s_{n-2}$$

At this time, since the operation value of the predictor 51 is added to the half adder 50, carry $c^{in}_{n-1}$ can be obtained by carry of $c^{in}_{n-2}$ and the result of addition for $c_{n-2}$ and $S_{n-2}$. Therefore, $c^{in}_{n-1}$ is changed to the following equation.

<Equation 11>

$$c^{in}_{n-1} = \text{overflow}(c_{n-2} \oplus s_{n-2}) + c^{in}_{n-2}) = (c_{n-2} \oplus s_{n-2}) \land c^{in}_{n-2}$$

As shown in the table 2, rounding$_{nearest}$(LSB, R, Sy) becomes $(LSB \land R) \lor (R \lor Sy)$. Therefore, the output values of the selector 90 and the $q^{NS}_0$ logic circuit 100 in case of NS and RS can be expressed as follows.

<Equation 12>

$$\text{Selector}^{NS} = (C^{in}_n \lor (f_{n-1} \land ((f_{n-1} \land R) \lor (R \lor Sy))))$$
$$q^{NS}_0 = f_{n-1} \land ((f_{n-1} \land R) \lor (R \land Sy))$$
$$\text{Selector}^{RS} = (c^{in}_n \lor ((f_n \land f_{n-1}) \lor (f_{n-1} \land (R \lor Sy))))$$

In this equation, the round-to-nearest mode 93 *is selected by the multiplexer 91 in response to the decoding bit signal.*

Figure 4:
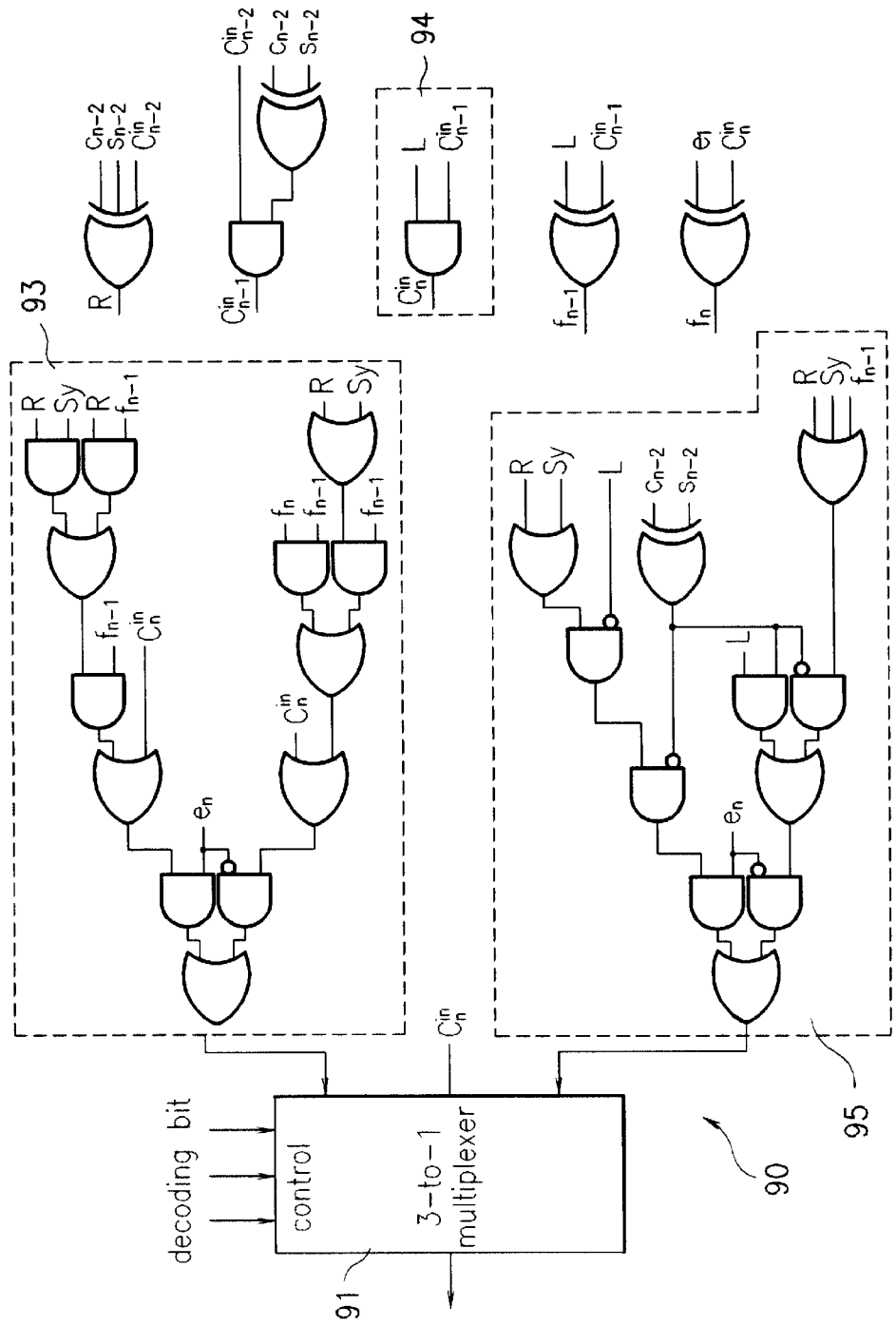
FIG. 4 is a logic circuit illustrating a selector of FIG. 2.

The round-to-nearest mode 93 provides a corresponding result value to the multiplexer 91 by means of the logic circuit shown in FIG. 4 in response to the input values of the equation 12.

2) Round-to-zero Mode

In the round-to-zero mode, the output of the predictor 51 is equal to the output of the predictor 51 in the round-to-nearest mode. The result thereof is shown in the following table 3.

Since rounding$_{zero}(X,X,X) = 0$, the output values of the selector 90 and the $q^{NS}_0$ logic circuit 100 in case of NS and RS can be obtained by the following equation 13 by replacing rounding$_{mode}$ in the equations 7 and 8 with 0.

<Equation 13>

$$\text{Selector} = c^{in}_n$$
$$q^{NS}_0 = f_{n-1}$$

The round-to-zero mode 94 provides a corresponding result value to the multiplexer 91 by the logic circuit of the gate as shown in FIG. 4.

3) Round-to-infinity Mode

It is assumed that $c^{in}_{n-2} = c_{n-2} \oplus s_{n-2} = L = \text{sticky bit}(Sy) = 1$. In this case, the result of the predictor 51 becomes $c^{in}_n = 1$, $f_{n-1} = 0$, $R = 0$, $Sy = 1$.

According to the table 2, the result of rounding becomes truncation because round bit R is zero. On the other hand, in the round-to-infinity mode, since sticky bit is 1 (Sy=1), the result of rounding becomes increment according to the table 4. Therefore, in the round-to-infinity mode, since the predictor 51 applied to the round-to-nearest mode cannot be used, the predictor 51 can be defined by the following equation.

<Equation 14>

$$\text{predictor} = (c_{n-2} \lor s_{n-2})$$

The following table 5 shows the results of $C^{in}_{n-1}$, R, the predictor 51 depending on $c_{n-2}, s_{n-2}, c^{in}_{n-2}$.

TABLE 5

| $C_{n-2}$ | $S_{n-2}$ | $C^{in}_{n-2}$ | $C_{n-2} \oplus S_{n-2}$ | $C^{in}_{n-1}$ | R | predictor |
|---|---|---|---|---|---|---|
| 0 | 0 | 0 | 0 | 0 | 0 | 0 |
| 0 | 1 | 0 | 1 | 0 | 1 | 1 |
| 1 | 0 | 0 | 1 | 0 | 1 | 1 |
| 1 | 1 | 0 | 0 | 1 | 0 | 1 |
| 0 | 0 | 1 | 0 | 0 | 1 | 0 |
| 0 | 1 | 1 | 1 | 1 | 0 | 1 |
| 1 | 0 | 1 | 1 | 1 | 0 | 1 |
| 1 | 1 | 1 | 0 | 1 | 1 | 1 |

The result of table 5 can be divided into two classes according to the value of $c_{n-2} \oplus s_{n-2}$ and $C^{in}_{n-2}$. In the first class, $c^{in}_{n-1}=0$ is achieved and the result value of R and the predictor 51 becomes 1, when $c^{in}_{n-1}=0$ and $c_{n-2} \oplus s_{n-2}=1$. In the second class, all cases excluding the cases of the first class, c and the predictor 51 have the same value.

In the first class, since R becomes 1, the result of rounding becomes increment by the table 4. At this time, $C^{in}_{n-1}=c^{in}_{n}=0$ and the predictor becomes 1 (predictor=1). Therefore, in case of NS, the result value $Q^{NS}$ after rounding according to the equations 4, 5 and 6 can be expressed as follows.

<Equation 15>

$Q^{NS}=(f_{2n-1} \ldots f_{n-1})+rounding_{infinity}(f_{n-1},R,Sy)$ $=D+c^{in}_{n-1}+rounding_{infinity}(f_{n-1},R,Sy)$ $=D+1$ $=D+predictor$ $=e_n \ldots eL$ Therefore, the results of the $q^{NS}_0$ logic circuit 100 and the selector 90 in case of NS are as follows. <Equation 16>

Selector=0

$q^{NS}_0=L$

In case of RS, the result value $Q^{RS}$ after rounding according to the equations 4, 5 and 6 can be expressed as follows. <Equation 17>

$Q^{RS}=D+c^{in}_{n1}+2\times rounding(f_n,f_{n-1},R\lor Sy)$ $=D+2$ $=D+predictor+1$ $=e_n \ldots eL+1$ Therefore, the result of the selector 80 becomes selector=L.

In the second class, since $c^{in}_{n-1}$ and the predictor 51 have the same result value, the result value $Q^{NS}$ after rounding in case of NS can be expressed as follows. <Equation 18>

$Q^{NS}=D+c^{in}_{n-1}+rounding_{infinity}(f_{n-1},R,Sy)$ $=D+predictor+rounding_{infinity}(f_{n-1},R,Sy)$ $=D+predictor+1$ $=e_n \ldots eL+rounding_{infinity}(f_{n-1},R,Sy)$ In this case, $rounding_{infinity}(LSB,R,Sy)$ is $R\lor Sy$ referring to the table 2. Therefore, the results of the $q^{NS}_0$ logic circuit 100 and the selector 90 are as follows.

<Equation 19>

$selector=L \land rounding_{infinity}(f_{n-1},R,Sy)=L \land (R\lor Sy)$ $q^{NS}_0=L+\oplus rounding_{infinity}(f_{n-1},R,Sy)=L \oplus (R\lor Sy)$ In case of RS, the result value $Q^{RS}$ after rounding can be expressed as follows.

<Equation 20>

$Q^{RS}D+C^{in}_{n-1}+2\times rounding_{infinity}(f_n,f_{n-1},R\lor Sy)$ $D+predictor+2\times rounding_{infinity}(f_n,f_{n-1},R\lor Sy)$ $=e_n \ldots e_1L+2\times rounding_{infinity}(f_n,f_{n-1},R\lor Sy)$ Therefore, the result of the selector 90 is output according to the following equation.

<Equation 21>

$Selector=rounding_{infinity}(f_n,f_{n-1},R\lor Sy)=f_{n-1}\lor R\lor Sy$

According to the equations 14~20, in case of round-to-infinity, the results of the selector 90 and the $q^{NS}_0$ logic circuit 100 depending on NS and RS can be expressed as follows.

<Equation 22>

$Selector^{NS}=(c_{n-2} \otimes s_{n-2}) \land (L \land (L \land (R\lor Sy)))$ $q^{NS}_0=((c_{n-2} \oplus s_{n-2}) \land L) \lor ((c_{n-2} \otimes s_{n-2}) \land (L \oplus (R\lor Sy))$ $Selector^{RS}=((c_{n-2} \oplus s_{n-2}) \land L) \lor ((c_{n-2} \otimes s_{n-2}) \land (f_{n-1} \lor R\lor Sy))$ Consequently, in the selector 90 of the present invention, as shown in FIG. 4, the result value of logic 93 input to the multiplexer 91 becomes the result value of the selector 90 in the round-to-nearest mode. Result values of logic 94 and 95 become the result values of the selector 90 in the round-to-zero and round-to-infinity modes respectively.

Figure 5:
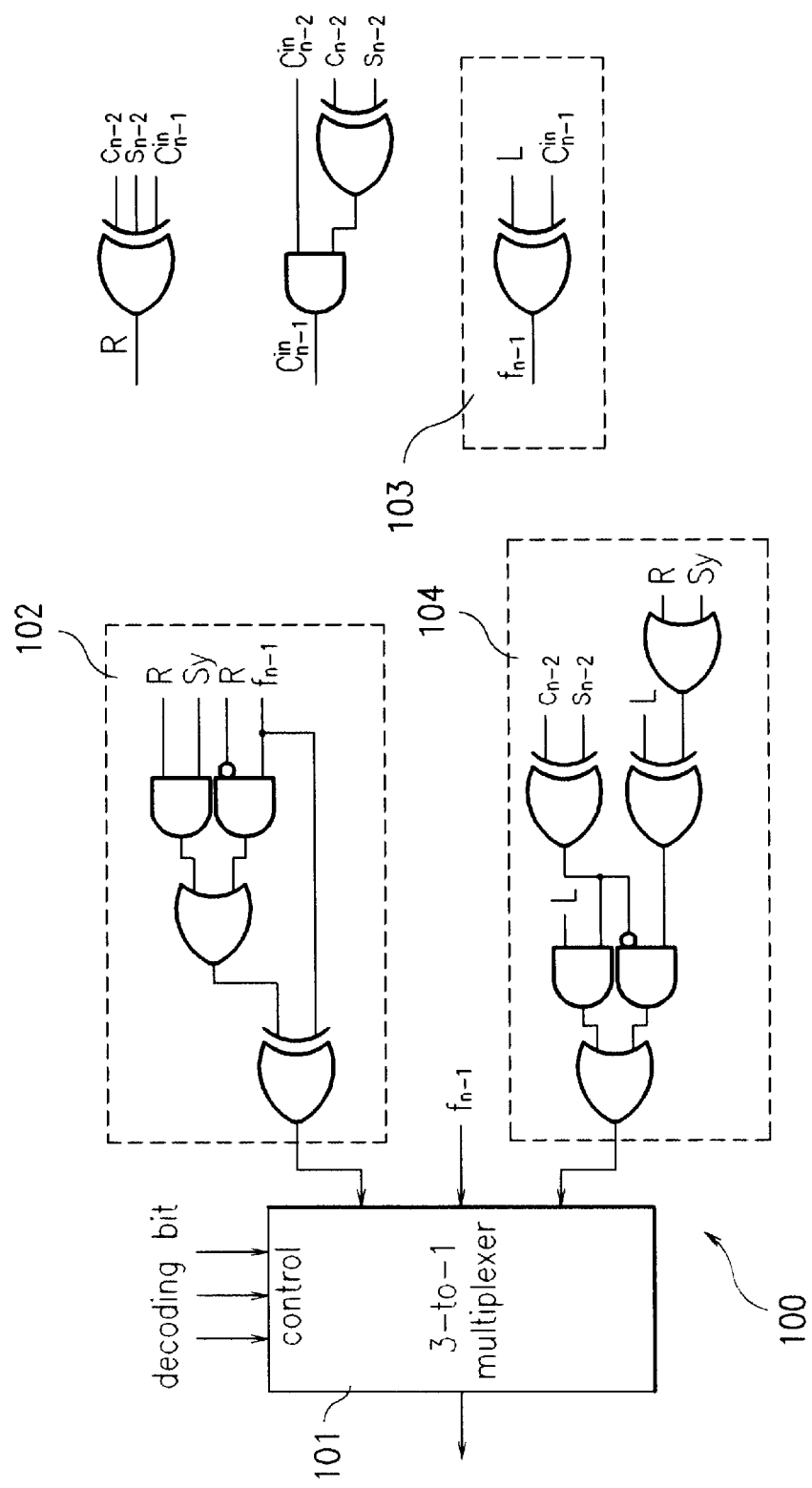
FIG. 5 is a logic circuit illustrating one embodiment of a $q^{NS}_0$ logic circuit of FIG. 2.

In the $q^{NS}_0$ logic circuit 100 of the present invention, as shown in FIG. 5, result values of logic 102 input to the multiplexer 101 become the result values of the selector 90 in the round-to-nearest mode. Result values of logic 103 and 104 become the result values of the selector 90 in the round-to-zero and round-to-infinity modes respectively.

At this time, input variables are $e_n$, $e_1$, L, $c^{in}_{n-2}$, Sy, $C_{n-2}$, $S_{n-2}$. Among them, en is a control signal which determines whether NS or RS. In addition, R, $C^{in}_{n-1}$, $C^{in}_n$, $f_{n-1}$, $f_n$ are generated from the variables $e_1$, L, $c^{in}_{n-2}$, Sy, $C_{n-2}$, and $S_{n-2}$, and serve as main factors which determine the selector 90.

As aforementioned, the apparatus for performing rounding and addition in parallel in a floating point multiplier according to the present invention has the following advantages.

Since rounding is performed in parallel with addition, a separate hardware for an adder required for rounding step in the conventional floating point multiplication operation is not required. Rounding and addition are performed in parallel in a single pipeline. Further, since the floating point multiplication can be performed at three steps, arithmetic processing speed is fast. And, four rounding modes according to IEEE's standard can be supported by the present invention.

It will be apparent to those skilled in the art that various modifications and variations can be made in the apparatus for performing rounding and addition in parallel in a floating point multiplier according to the present invention without departing from the spirit or scope of the invention. Thus, it is intended that the present invention covers the modifications and variations of the invention provided they come within the scope of the appended claims and their equivalents.

What is claimed is:

1. An apparatus for performing rounding and addition in parallel in a floating point multiplier, the apparatus comprising:

an adder that receives a 2n bit sum S and a 2n bit carry C generated by multiplying fraction portions of first and second n bit floating point numbers, wherein the adder has an n bit half adder and an 1 bit full adder to respectively add upper n+1 bits from the carry C and the sum S and a 1 bit prediction signal to generate an added carry and an added sum;

a $C^{in}_{n-2}$ carry overflow generator for generating an overflow carry $C^{in}_{n-2}$ to add to an n−2 bit of the carry C and an n−2 bit of the sum S;

a predictor that provides the 1 bit prediction signal of 0 or 1 to the 1 bit full adder for generating the added carry and added sum;

a carry select adder that adds each of 0 and 1 to an upper n bit value generated by adding the added carry with the added sum to generate both corresponding output values i0 and i1;

a selector that outputs a control signal of 0 or 1 based on a rounding mode of the floating point multiplier selected from one of a round-to-nearest mode, a round-to-zero mode, and a round-to-infinity mode to select an AR value obtained by addition and rounding from the two output values i0 and i1 of the carry select adder;

a first multiplexer that multiplexes the output values i0 and i1 in response to the control signal of the selector; and a result LSBNS $q^{NS}_0$ logic circuit that generates a least significant bit LSB of the AR value according to the rounding mode during no shift (NS).

2. The apparatus as claimed in claim 1, wherein the selector determines the selected one of the round-to-nearest mode, the round-to-zero mode, and the round-to-infinity mode based on a mode signal received from the floating point multiplier.

3. The apparatus as claimed in claim 1, wherein the carry select adder includes n bit 0 adder for adding 0 to the carry and n bit 1 adder for adding 1 to high n bit of the sum.

4. The apparatus as claimed in claim 1, wherein a control signal $e_n$ being a MSB of the output value i0 determines a state of RS (right shift) or NS (no shift) of the multiplexer.

5. The apparatus as claimed in claim 1, wherein the selector comprises:

a rounding circuit that operates in at least one of the three rounding modes;

a second multiplexer that selectively outputs an operation result being the control signal of the selected one of the three rounding modes in response to a, decoding control signal; and a decoder that applies the decoding control signal to the second multiplexer, wherein the decoding control signal is decoded depending on a sign bit and a mode bit.

6. The apparatus as claimed in claim 5, wherein the rounding circuit comprises:

a round-to-nearest logic circuit that outputs a first operation result;

a round-to-zero logic circuit that outputs a second operation result; and a round-to-infinity logic circuit that outputs a third operation result, wherein the second multiplexer selects an operation result from the rounding circuit based on the decoding control signal.

7. The apparatus as claimed in claim 1, wherein the result LSBNS $q^{NS}_0$ logic circuit comprises:

logic circuits that respectively generate a plurality of variable values according to the selected one of the rounding modes; and a third multiplexer that receives a second decoding signal to selectively generate the least significant bit of rounded value in case of NS by outputting one of the variable values of the logic circuits.

8. The apparatus of claim 1, wherein the sum $S=(S_{2n-1}, 2_{n-2}, \ldots S_0)$, the carry $C=(C_{2n-1}, C_{2n-2}, \ldots, C_0)$ and $f_{2n-1}, f_{2n-2} \ldots f_{n-1}=((C_{2n-1}, C_{2n-2} \ldots C_{n-2})+(S_{2n-1}, S_{2n-2}, \ldots S_{n-2})+C^{in}_{n-2}$, wherein $C^{in}_{n-2}$ is an overflow value of $(C_{n-3}, \ldots C_0)+(S_{n-3}, \ldots, S_0)$.

9. The apparatus as claimed in claim 8, wherein the selector outputs the control signal being one of Selector$^{NS}$ for rounding with no shift (NS) and Selector$^{RS}$ for rounding with right shift (RS), and wherein the Selector$^{NS}$, the Selector$^{RS}$ and the result LSBNS $q^{NS}_0$ logic circuit in the round-to-nearest mode respectively satisfy the following equations:

Selector$^{NS}=(C^{in}_n \vee (f_{n-1} \wedge ((f_{n-1} \wedge R) \vee (R \vee Sy))))$
$q^{NS}_0 = f_{n-1} \wedge ((f_{n-1} \wedge R) \vee (R \wedge Sy))$; and
Selector$^{RS}=(C^{in}_n \vee ((f_n \wedge f_{n-1}) \vee (f_{n-1} \wedge (R \vee Sy))))$, wherein "$\wedge$" is AND operation, "$\vee$" is OR operation, R is a round bit, Sy is a sticky bit and $C^{in}_n$ is n bit carry being equal to overflow $(C_{n-1}+S_{n-1}+C^{in}_{n-1})$ and $f_{n-1}$ is the position of n−1st rounding.

10. The apparatus as claimed in claim 8, wherein the selector output the control signal being Selector-RTZ and the result LSBNS $q^{NS}_0$ logic circuit in the round-to-zero mode respectively satisfy the following equations:

Selector-RTZ$=C^{in}_n$, and $q^{NS}_0 = f_{n-1}$, wherein $C^{in}_n$ is n bit carry being equal to overflow $(C_{n-1}+S_{n-1}+C^{in}_{n-1})$ and $f_{n-1}$ is the position of n−1st rounding.

11. The apparatus as claimed in claim 8, wherein the selector outputs the control signal being one of Selector$^{NS}$ for rounding with no shift (NS) and Selector$^{RS}$ for rounding with right shift (RS), and wherein the Selector$^{NS}$, the Selector$^{RS}$ and the result LSBNS $q^{NS}_0$ logic circuit in the round-to-infinity mode respectively satisfy the following equations:

Selector$^{NS}=(c_{n-2} \otimes s_{n-2}) \wedge (L \wedge (R \vee Sy))$,
$q^{NS}_0 = ((c_{n-2} \oplus s_{n-2}) \wedge L) \vee ((c_{n-2} \otimes s_{n-2}) \wedge (L \oplus (R \vee Sy))$;
Selector$^{RS}=((c_{n-2} \oplus s_{n-2}) \wedge L) \vee ((c_{n-2} \otimes s_{n-2}) \wedge (f_{n-1} \vee R \vee Sy))$, wherein "$\wedge$" is AND operation, "$\vee$" is OR operation, "$\oplus$" is exclusive OR operation, "$\otimes$" is exclusive NOR operation, R is a round bit, Sy is a sticky bit and L is a LSB of the added sum S, which is input to the carry select adder.

12. A method for performing rounding and addition in parallel in a floating point multiplier, the method comprising:

a multiplication step of multiplying fraction portions of two n bit floating point numbers to generate sum S and carry C of 2n bits;

a first addition operation step that adds a fraction portion for the carry and sum obtained by the multiplication step and a 1 bit predictor;

a second addition operation step that adds 0 or 1 to modify a result value generated by the first addition operation step;

a multiplexing step of selectively outputting one of the modified result values after rounding and addition that selectively supports all IEEE standard rounding modes in response to an operation result of the second addition step; and a normalization step of normalizing the selected one modified result value obtained by the second addition operation to output a final operation value.

* * * * *